United States Patent
Liedl, Jr. et al.

[19]

[11] Patent Number: 6,136,366
[45] Date of Patent: Oct. 24, 2000

[54] METHOD FOR MAKING NUT BUTTER AND RELATED PRODUCTS

[75] Inventors: Frank G. Liedl, Jr., Bridgewater; Kenneth F. Rowe, Somerset, both of N.J.

[73] Assignee: Bestfoods, Englewood Cliffs, N.J.

[21] Appl. No.: 09/322,683

[22] Filed: May 28, 1999

Related U.S. Application Data

[62] Division of application No. 08/837,697, Apr. 22, 1997.

[51] Int. Cl.⁷ .................................. A23J 1/14; A23L 1/38
[52] U.S. Cl. ............................................ 426/633; 426/518
[58] Field of Search .................................... 426/633, 489, 426/518

[56] References Cited

U.S. PATENT DOCUMENTS

| | | | |
|---|---|---|---|
| 3,619,207 | 11/1971 | Dzurik et al. | 99/128 |
| 3,903,311 | 9/1975 | Billerbeck | 426/633 |
| 3,977,613 | 8/1976 | Moskowitz | 241/261.3 |
| 4,000,322 | 12/1976 | Billerbeck | 426/633 |
| 4,004,037 | 1/1977 | Connick | 426/324 |
| 4,814,195 | 3/1989 | Yokoyama et al. | 426/633 |
| 4,828,868 | 5/1989 | Lasdon et al. | 426/633 |
| 4,839,193 | 6/1989 | Mange et al. | 426/633 |
| 5,079,027 | 1/1992 | Wong | 426/633 |
| 5,164,217 | 11/1992 | Wong et al. | 426/632 |
| 5,202,147 | 4/1993 | Traska | 426/633 |
| 5,230,919 | 7/1993 | Walling | 426/633 |
| 5,240,734 | 8/1993 | Izzo et al. | 426/633 |
| 5,268,192 | 12/1993 | Zook et al. | 426/633 |
| 5,302,409 | 4/1994 | Franklin | 426/633 |
| 5,417,999 | 5/1995 | Cammarn et al. | 426/633 |
| 5,433,970 | 7/1995 | Wong et al. | 426/633 |
| 5,714,193 | 2/1998 | Fix | 426/519 |

*Primary Examiner*—Carolyn Paden
*Attorney, Agent, or Firm*—Norris, McLaughlin & Marcus

[57] ABSTRACT

Nut butters and nut spreads having improved sensory and textural characteristics are prepared by (a) mixing together nut solids, a stabilizing composition, and optionally an emulsifier; (b) introducing the mixture into a mill comprising a stator and a circularly rotating rotor capable of grinding the mixture while producing centrifugal forces; and (c) grinding the mixture such that the particles of the mixture impact with one another and the rotor/stator forming a ground paste. The method can be used to produce regular and reduced calorie and/or reduced fat nut butter or nut spread compositions such as peanut butter.

20 Claims, 5 Drawing Sheets

METHOD FOR MAKING NUT BUTTER AND RELATED PRODUCTS

CROSS-REFERENCE TO RELATED APPLICATIONS

This is a division of application Ser. No. 08/837,697, filed on Apr. 22, 1997.

BACKGROUND OF THE INVENTION

1. Field of the Invention

This invention relates to the production of nut butter products and related products. More particularly, the invention relates to a method of producing peanut butter products that provides a creamy product with only one grinding step.

2. Description of the Related Art

The high nutritional value and good taste make nut butters, particularly peanut butter, an important food product in many households. New methods to improve the consumer appeal of peanut butters in respect to taste and texture are continually being sought. These include methods of improving nut butters having typical fat levels (approximately 50%) and those having reduced fat levels.

Peanuts, cashews, almonds, walnuts, pecans, and the nut butter products made from them, are known sources of vegetable protein and other nutrients. Although there is a dietary need for protein, and vegetable proteins provide a ready economic source, nuts and nut products also contain high amounts of fat. Peanuts, for example, comprise over 50% fat and account for over 90% of the fat in peanut butter. Increasingly, people are reducing the amount of fat in their diets in response to information linking health problems with high fat diets. Consumption of nuts and nut products is therefore reduced by those seeking lower fat sources of protein. Since nuts represent a good source of protein, and peanut butter in particular is a popular product, a need exists for a method of making the desired products while reducing the amount of fat.

The terms "nut butter" and "peanut butter" in particular as used herein are intended to include any peanut butters (21 C.F.R. 164.150), peanut spreads (21 C.F.R. 102.23(a)) and imitation peanut butters (21 C.F.R. 102.23(b)) and is not meant to be limited in any manner by regulatory definitions.

Methods of making peanut butter are described in the patent literature such as in U.S. Pat. No. 3,619,207 (Dzurik et al.) which describes an improved peanut paste ingredient and a method of making same using a homogenizer. U.S. Pat. No. 4,004,037 (Connick) describes a method of grinding peanuts in the presence of solid carbon dioxide to reduce oxidation of the peanut oil during grinding and reduce the amount of dissolved oxygen, thereby resulting in improved stability and flavor.

Various methods have been developed to reduce the amount of fat in nut butter products such as peanut butter. These methods generally follow one or a combination of two approaches, those that use a normal amount of nuts in the mix but reduce the fat in the nuts and those that keep the fat in the nuts but replace some of the nuts with bulking agents. Several patents have issued showing methods and compositions improving on these general approaches.

U.S. Pat. No. 5,240,734 (Izzo et al.) discloses a composition and method of making a reduced fat peanut butter in the form of a water-in-oil emulsion which contains a continuous peanut butter oil phase comprised of peanut butter and a protein completing agent to maintain the consistency of the continuous peanut butter oil phase, and a discontinuous aqueous coagulated protein phase to reduce the fat content of the peanut butter which contains a coagulable dairy or vegetable protein and a protein coagulating agent.

U.S. Pat. No. 5,230,919 (Walling et al.) discloses a reduced fat nut or oilseed butter composition which contains from about 40% to about 67% nut solids, from about 33% to about 45% oil, and from 0 up to about 4% stabilizer, 40% bulking agent, 8% flavorant and 3% emulsifier.

U.S. Pat. No. 5,302,409 (Franklin) discloses a reduced fat peanut butter which is obtained by removing oil from ground peanuts preferably by centrifuging the ground peanuts until a supernatant oil layer is formed above the ground peanuts and separating the ground peanuts from the supernatant oil layer.

A high protein and/or low fat nut spread is made according to U.S. Pat. No. 5,433,970 (Wong et al.) by employing a homogenizer and a colloid mill or series of colloid mills to obtain a desired particle size and viscosity.

U.S. Pat. No. 4,828,868 (Lasdon et al.) discloses a low calorie, low fat peanut butter like product wherein unroasted, defatted peanut flour is milled in water to a smooth, free-flowing consistency and then cooked at a temperature of at least 175° F. but below the boiling point of the water/flour mixture. The patent discloses that the resulting product has a water content of 45 to 55 percent and a fat content of from 1 to 25 percent.

The method of the present invention represents an improvement in the manner of grinding which releases a maximum amount of native oil from the nut matrix while reducing the particle size of the solid components. The free oil which is released is hypothesized to coat the solid particles improving mouth feel "slip" characteristics. The amount of available free oil lowers product viscosity which imparts processability and machinability. The amount of oil expelled or the degree of particle size reduction can be manipulated according to the invention to produce, in a cost effective way, an organoleptically pleasing product.

The method of the present invention represents a further improvement on the approach that seeks to reduce the fat in nut butters by replacing some of the nuts in the mixture with bulking agents. The entire mixture of ingredients is ground in a mill which produces high centrifugal forces thereby grinding all of the ingredients into an acceptable particle size while expelling fat out of the nut matrix and producing a nut butter with the desired mouth feel and taste.

An improvement provided by the invention is that the entire mixture can be ground in one step while producing a creamy product. A one step method of grinding is especially useful for the production of reduced fat peanut butters where the lack of available oil in the mixture presents problems with forming a creamy product which is necessary for processing with conventional finishing and packaging operations. One or more additional grinding steps can be used if more fluidity is desired.

A further improvement provided by the invention is that the size and form of the major and minor ingredients can be as large as is commercially and economically feasible without affecting grinding in respect of overall particle size reduction or the amount of oil expelled. Accordingly, materials in their most raw form such as flakes, slivers, spheres, granules and the like can be used without pre-treatment, such as by grinding.

All percentages and parts expressed herein are on a weight/weight basis unless specified otherwise.

SUMMARY OF THE INVENTION

Nut butter compositions and reduced fat and/or reduced calorie nut spread compositions are prepared having improved sensory and textural qualities and improved spreadability. The compositions comprise (i) a nut ingredient which can include nuts, nut slurry, nut oil and/or defatted nut flour, (ii) seasonings such as salt, sugar and the like, and these may be optional in the case of reduced calorie and/or reduced fat nut spreads, (iii) stabilizers and, optionally, emulsifiers and (iv) bulking agents, particularly for reduced calorie and/or reduced fat nut spreads. The invention described herein can consist essentially of the foregoing ingredients and the invention described herein can consist of the foregoing ingredients.

The compositions of the invention have a span from about 2.5 to about 6.0, a particle size distribution wherein at least 90% of the particles are smaller than about 40 microns ($\mu$m), preferably smaller than about 35 $\mu$m, at least 50% of the particles are smaller than about 10 $\mu$m, preferably smaller than about 9 $\mu$m and at least 10% of the particles are smaller than about 3 $\mu$m, preferably smaller than about 2.0 $\mu$m, and a Brookfield viscosity from about 6,000 centipoise (cp) to about 14,000 cp, preferably from about 7,500 cp to about 9,500 cp taken at a temperature of 85° C. after 60 seconds while running the viscometer at 20 rpm with a spindle D, heliopath. The Brookfield viscometer used was a model HATD which measures the viscosity of the product at a constant shear rate using the heliopath spindle D, a rotating shear element that cuts a helical path through the test sample.

The invention further provides a method of producing the nut butter or nut spread compositions which comprises:

a) mixing together a nut ingredient, seasoning (if desired), stabilizing agents and, optionally, emulsifiers and, if desired, oil reducing bulking agents;

b) introducing the mixture into a mill comprising a stator and a circularly rotating rotor capable of producing centrifugal forces to cause efficient grinding (particle size reduction) and maximize oil expulsion; and c) grinding the mixture such that the particles of the mixture impact with one another and the rotor/stator of the mill, forming a ground paste; thus producing the nut butter composition.

The invention also provides methods which consist essentially of the foregoing steps and methods which consist of the foregoing steps.

DETAILED DESCRIPTION OF THE INVENTION

Figure 1:
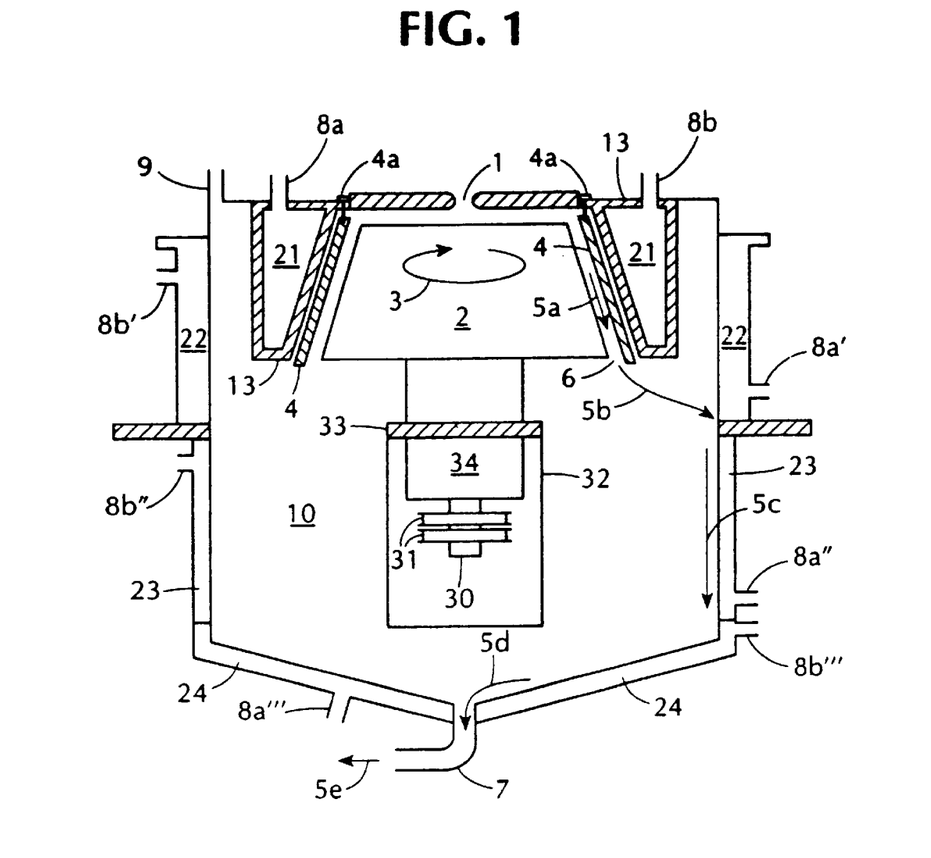
FIG. 1 is a schematic of a section of a preferred embodiment of the mill useful in the invention.

This invention provides a method of producing a nut butter composition which comprises mixing together a nut ingredient such as nuts, seasoning (if desired), stabilizing agents and, optionally, emulsifying agents and, if desired, oil reducing bulking agents and introducing the mixture with air into inlet 1 of a mill 10 as illustrated in FIG. 1.

FIG. 1 is a schematic depicting a Bauermeister model GM 80 gap mill. The mill 10 comprises a circularly rotating rotor 2 which rotates in direction 3 thereby producing centrifugal forces which cause the ingredients of the mixture to impact with the stator 4 and with one another. As the mixture generally follows the direction of arrow 5a, the continuing impacts cause continuing reduction in the sizes of the particles forming a ground paste in one pass through the mill. The ground paste leaves the rotor/stator at opening 6 and generally follows the path designated by arrows 5b, 5c and 5d and exits through conduit 7 in the direction 5e, thus producing the nut butter or nut spread composition of the invention.

During the operation of the mill 10, coolant can be introduced into one or more than one of four cooling zones, 21, 22, 23 and 24. In cooling zone 21 (also referred to herein as a "first cooling zone") coolant is introduced into conduit 8a and removed through conduit 8b. In cooling zone 22 (also referred to herein as a "second cooling zone") coolant is introduced into conduit 8a' and removed through conduit 8b'. In cooling zone 23 (also referred to herein as a "third cooling zone") coolant is introduced into conduit 8a" and removed through conduit 8b". In cooling zone 24 (also referred to herein as a "fourth cooling zone") coolant is introduced into conduit 8a'" and removed through conduit 8b'". Water can be used as the coolant but the preferred coolant is a solution of about 30–80% ethylene glycol and water, most preferably about 70% ethylene glycol and about 30% water. Air is removed at conduit 9.

Rotor 2 is driven by drive shaft 30 having pulleys 31 affixed thereto and belts (not shown) are connected to an external motor (not shown). The belts pass through belt tunnel 32 which isolates them from the product in the mill. Support member 33 maintains in a fixed position the belt tunnel 32 and a bearing 34.

The space (distance) between the rotor 2 and the stator 4 is referred to herein as the gap and the gap is adjusted by raising or lowering the stator 4 using adjustment bolts 4a. The gap is made smaller when the stator is lowered and it is made larger when the stator is raised. Portholes (not shown) are provided in the top of the mill for insertion of a feeler gauge to measure the size of the gap.

Figure 2:
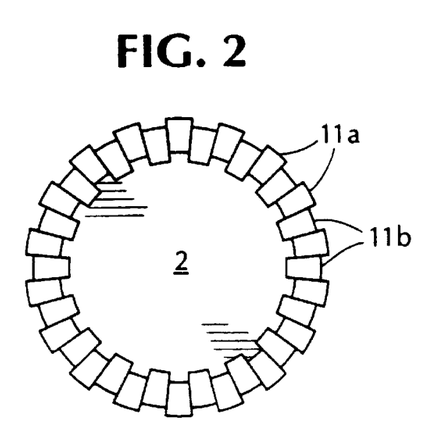
FIG. 2 is a schematic top view of the rotor.

FIG. 2 is a schematic top view of rotor 2 illustrating protruding vanes 11a and recess vanes 11b which are sometimes referred to as blades or rotor blades.

Figure 3:
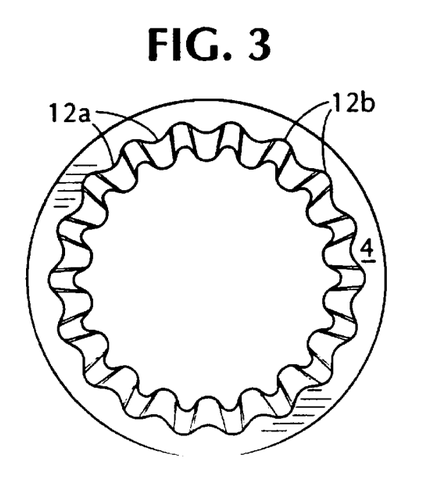
FIG. 3 is a schematic bottom view of the stator.

FIG. 3 is a schematic bottom view of stator 4 illustrating protruding corrugations 12a and recess corrugations 12b. This also can be referred to as a grinding baffle. Stator 4 is held in place by adjustment bolts 4a which are mounted on housing 13. The gap is the space between protruding vanes 11a and protruding corrugations 12b (i.e., the distance between the protruding points of the head and the stator).

The nut ingredient of the invention can be, or can be prepared from, one type of nuts or a mixture of different types of nuts and in a preferred embodiment of the invention, the nuts are peanuts. Other nuts, however, such as cashews, almonds, walnuts, and pecans are useful to produce similar nut products. The nut ingredient can be added to the mixture as whole nuts, split nuts, ground nuts, nut slurry and/or nut flour and, if desired, nut oil can be used. The composition of the nuts used may be those containing all of the available fat or those in which a portion of the fat has been removed via conventional means. In a typical peanut butter formulation the nuts are combined with stabilizers and, optionally, emulsifiers, sweeteners and salt. Stabilizers are usually present in amounts from about 0.5 to about 2.5% by weight of the final product. Typical stabilizers include edible glyceride fats or partially or fully hydrogenated oils such as rapeseed, cottonseed, corn, peanut, soybean, linseed, or palm oils. Emulsifiers, if present, usually represent from about 0.1 to about 1% by weight of the final product. Examples of suitable emulsifiers include, but are not limited to lecithin, monoglycerides, glycerine, propylene glycol and the like.

Sweeteners which can be added as ingredients of the invention include, for example, sucrose, dextrose, fructose, honey, molasses, saccharin or other known sweeteners. A regular peanut butter formulation will contain from about 0 to about 8% by weight added sweetener. Salt can also be added to the formulation as a flavoring agent and is typically added in amounts from about 0 to about 2% by weight.

As noted above, when preparing a reduced fat formulation, some of the peanuts or other fat containing components can be replaced with so called "bulking agents". The use of bulking agents allows for the use of full fat peanuts to provide the necessary taste to the final product while reducing the total amount of fat in the product. The bulking agent is chosen such that it does not add undesired flavors or mask the peanut taste. Typical bulking agents used include but are not limited to polydextrose, maltodextrin, corn syrup solids, microcrystalline cellulose, conventional carbohydrates and combinations thereof. In reduced fat peanut butter or spread formulations using bulking agents, the bulking agent including non-fat minor ingredients such as salt and sweeteners and other carbohydrates can represent up to about 60%, and generally from about 10% to about 50%, of the weight of the final product. Additional flavoring and protein enhancers can also be added to the mixture.

The method of this invention also provides for the use of peanut skins in the production of peanut butters. Use of the skins allows for an increase in flavor and color as well as a reduction in fat. The typical fat content of peanut skins in red skin peanuts is only 11.67%. In conventional peanut butter processes the skins of the peanut are discarded prior to milling to avoid the formation of off-color "specks" in the product as well as a potential bitter aftertaste. In the present invention all of the skins do not have to be discarded but can be ground to render the skin particles visually undetectable yet functional. Use of the skins allows for a reduction in additives such as bulking agents, peanut flour or other peanut enhancing flavor ingredients.

Preferred recipes for regular peanut butter and low fat peanut butter generally are as follows:

| Ingredients | Regular Peanut Butter | LCW Fat Peanut Butter |
|---|---|---|
| peanuts, peanut slurry, peanut oil or defatted peanut flour | 90–96% | 25–70% |
| seasonings (salt, sugar, etc.) | 1–9% | 0–10% |
| stabilizer | 0.5–2.5% | 0.3–2% |
| emulsifiers | 0–1% | 0–1% |
| bulking agents | 0 | 10–60% |

In the process of the invention, the ingredients of the formulation, whether full fat or reduced fat, may be combined and milled together. The mill employed is capable of producing centrifugal forces such that the ingredients not only contact the rotor but also impact one another, adding to the grinding that takes place at the rotor and stator and producing a ground paste having particles of essentially uniform size with maximum expelled native oil. The expulsion of oil from the nut matrix may be executed in the presence of one or more or all formula ingredients or with the nut portion alone. This release of oil aids in processability as well as finished product functionality. According to the invention, the percentage of free oil released in a typical 25% reduced fat peanut butter has been measured at 14.12%. This compares with a release of only 12.84% when grinding using two or more passes through a conventional mill. The additional oil released aids in processability when low fat products are made. In a typical regular peanut butter the oil release according to the invention can be more than 25%.

A rotor circularly rotating within a mill casing can produce the necessary centrifugal forces to provide the particles with enough kinetic energy to impact one another and produce a product having a particle size distribution that provides superior sensory characteristics to nut butter products, generally less than 70 $\mu$m and preferably in the 20–60 $\mu$m range wherein at least 90% of the particles are smaller than about 40 $\mu$m. In a preferred embodiment, the mill is a Bauermeister GAP mill (Bauermeister, Inc., Memphis, Tenn., U.S.A.) and model GM 80 of the mill is depicted in FIG. 1. Ingredients are added at the top directly to a rotor. The rotor weight and rotational speed provides the centrifugal forces of the claimed method and it is surrounded by a mill housing to which is connected a stator in the form of a grinding baffle. The grinding baffle and the rotor comprise a mill head at which the ingredients are ground. The grinding baffle is separated from the rotor at a space of between about 1.0 and 8.0 millimeters (mm). This separation, also referred to herein as the "gap", is adjusted along with the rotor speed for different formulations of nut butters depending on ingredients used as well as desired product performance. For example, in a preferred embodiment, producing a regular full fat peanut butter, the gap is set at between 3.0 mm and 5.0 mm. In another preferred embodiment, producing a reduced fat peanut butter, the gap is set at between 1.5 mm and 5.0 mm.

The mill housing also comprises a vent 9 to allow for air to be drawn off the milled product. Intake air is provided directly to the mill head at inlet 1 along with the ingredients of the formulation. In one embodiment, the mill further comprises a gas injection port (not shown) to provide for injection of air or a combination of air and inert gasses such as nitrogen, argon or carbon dioxide to the product as it is being milled. The injected or forced gas or air not only causes turbulence in the mass but also allows for the removal of moisture and undesirable flavor volatiles from the milled product. Removal of the moisture aids in the formation of the product by reducing the viscosity of the product and providing a microbiological stability. The vent allows for drawing off excess air from the normal operation of the mill and any additionally injected air or gasses carrying off moisture and volatiles. The air/gas intake is also cooled to assist in heat transfer and volatile removal and recovery.

The ground product travels from the rotor and stator generally in the direction of arrows 5a, 5b and 5c and out of the mill housing in the direction of arrow 5d through the product discharge port 7 in the direction of arrow 5e. The internal surfaces of the mill housing can be cooled, normally with circulating a chilled solution of ethylene glycol and water, and scraped surface agitators can be used to improve heat transfer. Four separate circulation systems allow for maintaining desired temperatures independently in different parts of the mill as explained above.

The products of the invention have a span from about 2.5 to about 6.0 and a Brookfield viscosity from about 6,000 cp to about 14,000 cp, preferably from about 7,500 cp to about 9,500 cp, taken at a temperature of 85° C. after 60 seconds while running the viscometer at 20 rpm with a spindle D, heliopath. A Brookfield viscometer model HATD was used as explained above.

EXAMPLES

Unless otherwise noted, all weights are recited in percent of total weight of mixture.

Example 1

The following ingredients were mixed together and ground in a Bauermeister Gap mill, model GM 40:

TABLE 1

| Peanuts | 59.22 |
|---|---|
| Seasoning (sugar and salt) | 7.20 |
| Stabilizer | 0.90 |
| Maltodextrin | 25.33 |
| Soy Protein | 5.25 |
| Vegetable Oil | 2.10 |
| Total | 100.00% |

The stabilizer used in this and all formulations discussed herein is a blend of hydrogenated rapeseed and soybean oils. "Soy" refers to soy protein added to provide additional protein. Vitamins and minerals may also be added if desired. The mill gap was set at 2.2 mm and the rotor tip speed (tangential velocity calculated at the average outer radius on a vane 11a of rotor 2) was 123 meters/second (m/sec.). The mill was initially run without cooling water and the temperature rose to 215° F. City water was started as cooling water at this point and the temperature dropped to 179° F. (The Bauermeister model GM 40 has one cooling zone for the entire mill.) The mill was run at a capacity of 820 lbs/hr. The product was produced with a temperature at the outlet of 175° F. Viscosity of the product at 174° F. was 17600 cp. after 30 sec. and 17400 cp. after 1 minute (min.). Particle size (maximum) as measured by micrometer was 43 microns. The product was then degassed for 30 min. at 22–25 mm Hg vacuum to remove air from the milled product. This formulation produced a product which comprised 33.75% total fat, representing a 25% reduction in fat from regular peanut butter formulations with acceptable textural and sensory characteristics.

Example 2

The following ingredients were mixed together in the Bauermeister model GM 40 Gap mill:

TABLE 2

| Peanuts | 32.70 |
|---|---|
| Partially Defatted Peanuts | 24.00 |
| Corn Syrup Solids | 12.17 |
| Seasonings (salt, sugar) | 1.42 |
| Stabilizer | 0.45 |
| Polydextrose | 29.26 |
| Total | 100.00 |

The formulation produces a peanut butter comprising 25.02% fat by weight which represents a fat reduction of approximately 50% with a calculated protein of approximately 19%. The batch was processed by combining all ingredients and feeding into the mill at 360 pounds/hr at a gap setting of 3.5 mm and 123 meter/second tip speed.

Example 3

A reduced fat peanut spread was prepared in a Bauermeister Gap mill, model GM-80.

As a first step, a slurry was prepared by mixing the following components:

TABLE 3

| Ground Roasted Peanuts | 97.20% |
|---|---|
| Granular Salt | 1.47% |
| Granular Stabilizer | 1.33% |
|  | 100.00% |

The oil content of the slurry was 52.36% and the temperature was 71° C. The slurry was cooled to 38° C. by passing it through a scraped surface heat exchanger and then it was fed along with corn syrup solids into the Gap mill at a continuous combined rate of 30 kilograms per minute. The corn syrup solids contributed 32.20% of the total feed rate. Air was also fed into the inlet of the mill. The mill was set at the following conditions:

Gap Setting=3.0 mm
Tip Speed=100 meters/sec

Air flow=300 cfm nominal

Air Temp=10–12° C.

The cooling zones of the mill were utilized with a coolant inlet temperature of 10° C. The motor load driving milling was between 90 and 115 amps. The resulting product had a fat content of 35.5% and was discharged from the mill at 80°–90° C. Brookfield viscosity of this product ranged from 9,000 to 13,000 cp and had a measurement of approximately 7 mils. on a Grind Gauge PB-30 made by Precision Gauge and Tool Co., 28 Volkenand Ave., Dayton, Ohio 45410 U.S.A. Maximum particle size by micrometer measurements ranged from 60–70 microns.

Example 4

A regular peanut butter was prepared in a Bauermeister Gap mill, model GM-80 using the same formula as set forth in Table 1. The mill gap was set at 2.0 mm and the rotor tip speed was 123 meters/sec. Chilled water having a temperature from about 7° C.–12° C. was used for cooling in all four cooling zones. Water exiting the first cooling zone had a temperature from 50° C.–70° C. and water exiting the other three zones had a temperature from 8° C.–12° C. The mill was run at a capacity of 33 pounds/minute and the product exited the mill at a temperature of 95° C.–100° C. Brookfield viscosity of the product was 8100 cp at 85° C., 60 seconds, 20 rpm, using spindle D, heliopath.

Example 5

Comparative particle size analyses were conducted for a reduced fat peanut spread. Two peanut spread products were made using identical ingredients. One was manufactured using the Gap mill and the other was manufactured using a conventional manufacturing process. The analyses were made on a Mastersizer MS 20 (Malvern Instruments, Malvern, England). An isooctane dispersant was used with a pump speed at ¾ turn and no sonication. Analytical results for the Gap mill product are set forth in Table 4 and illustrated in FIG. 4 and results for the conventionally manufactured product are set forth in Table 5 and illustrated in FIG. 5.

Figure 4:
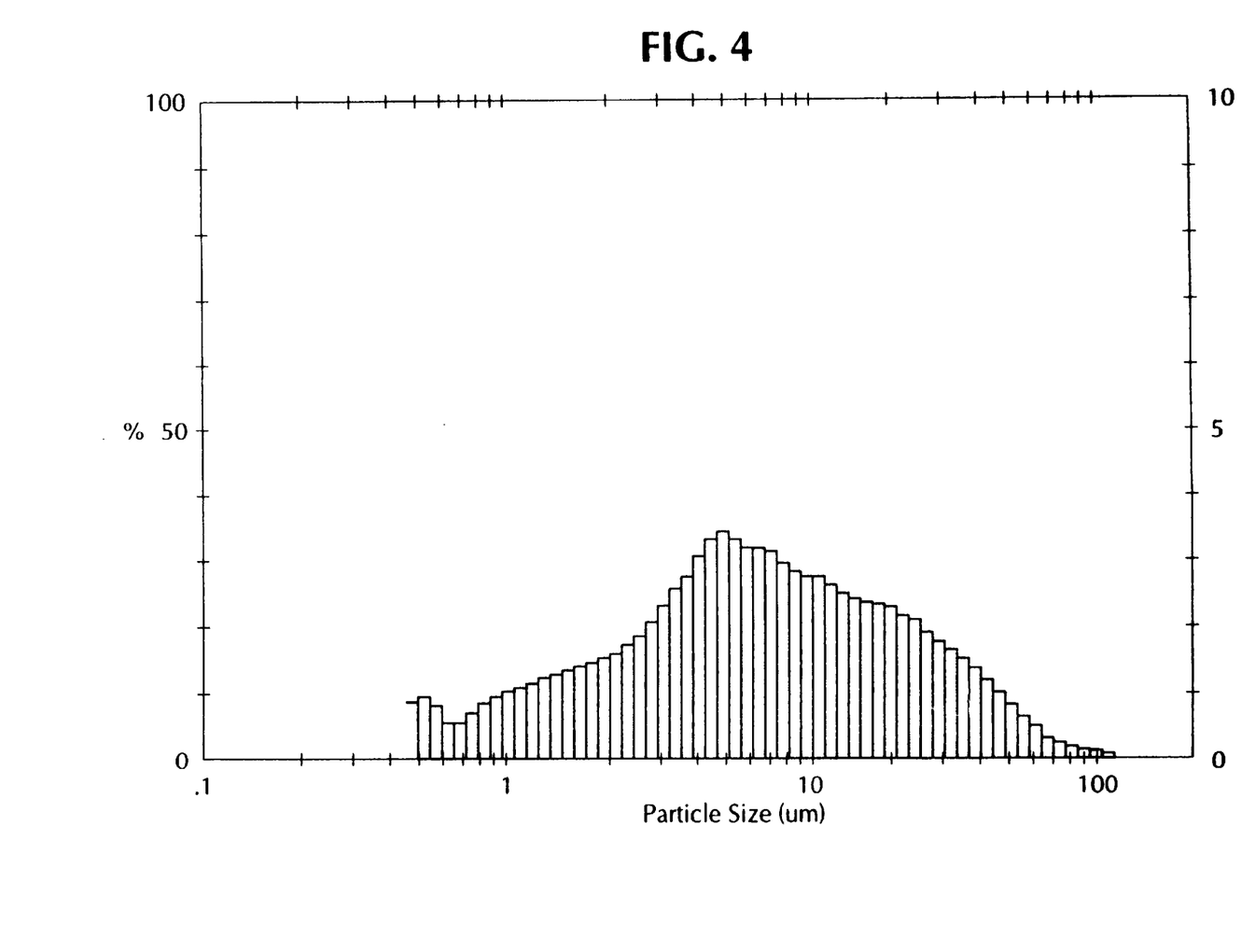
FIG. 4 is a particle size distribution curve of a peanut butter product of the invention.
Figure 5:
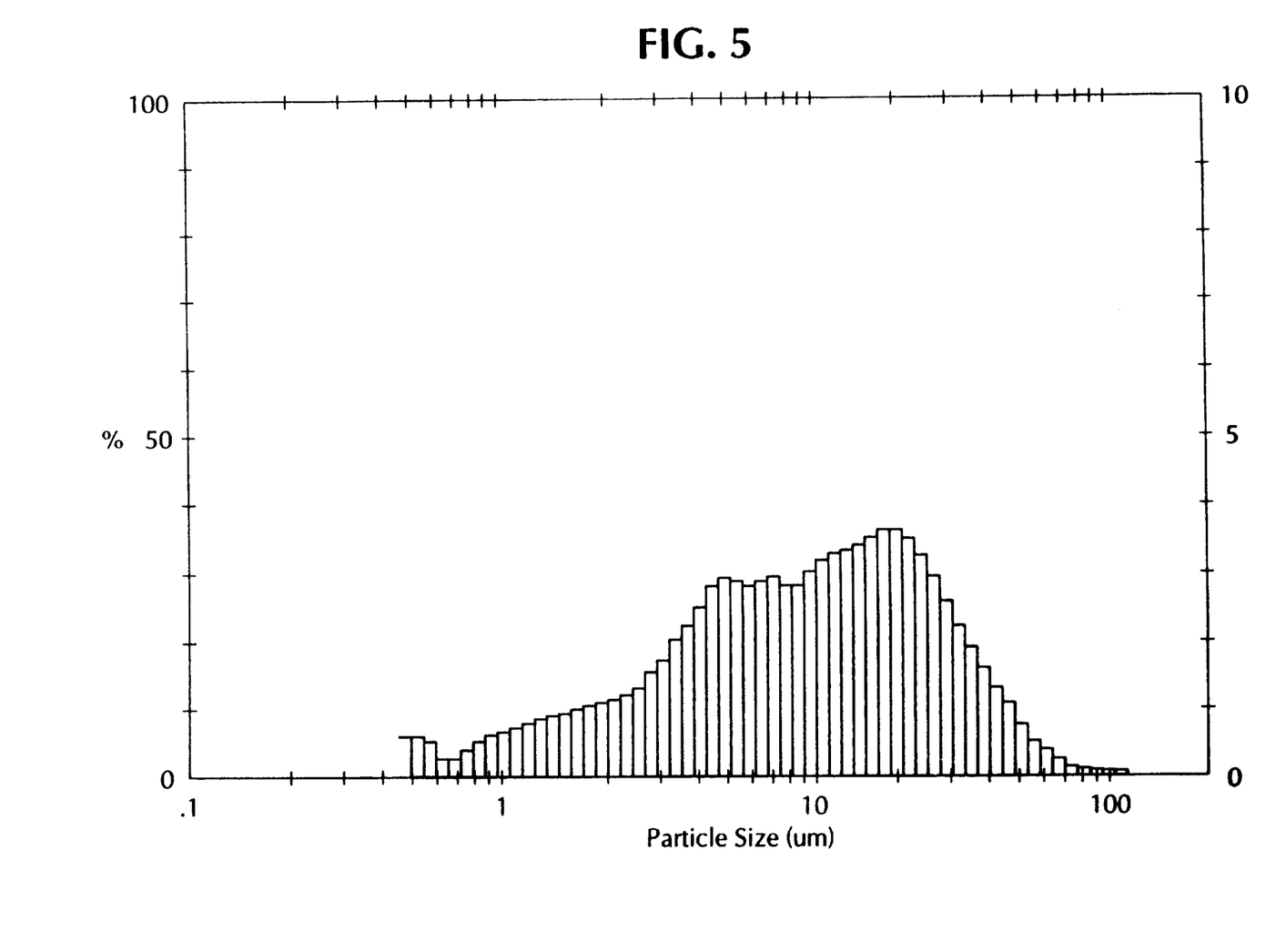
FIG. 5 is a particle size distribution curve of a conventional peanut butter product.

In Table 4, the span, calculated as $$\frac{D[v, 0.9] - D[v, 0.1]}{D[v, 0.5]}$$

was 4.16 and the mean particle size [D4,3] was 11.83 μm. The mean of smaller particles [D 3,2] was 2.94 μm. Ninety percent of the particles were smaller than 29.41 μm, D[v, 0.9], 50% were smaller than 6.78 μm, D[v, 0.5], and 10% were smaller than 1.19 μm, D[v, 0.1]. The span for the conventionally manufactured product was 2.96. A comparison of FIGS. 4 and 5 illustrates that the Gap mill product has a more even, flatter curve for most of the particles.

TABLE 4

| High Size | Under % | High Size | Under % | High Size | Under % | High Size | Under % | High Size | Under % | High Size | Under % | Span 4.16 |
|---|---|---|---|---|---|---|---|---|---|---|---|---|
| 180 | 100 | 64.4 | 99.1 | 23.0 | 84.9 | 8.25 | 56.7 | 2.95 | 24.2 | 1.06 | 8.6 | D[4,3] |
| 164 | 100 | 58.7 | 98.6 | 21.0 | 82.7 | 7.51 | 53.5 | 2.69 | 22.3 | 0.96 | 7.7 | 11.83 μm |
| 149 | 100 | 53.4 | 98.0 | 19.1 | 80.5 | 6.84 | 50.3 | 2.45 | 20.6 | 0.88 | 6.7 | |
| 136 | 100 | 48.7 | 97.2 | 17.4 | 78.1 | 6.23 | 47.0 | 2.23 | 19.0 | 0.80 | 5.9 | D[3,2] |
| 124 | 100 | 44.3 | 96.2 | 15.9 | 75.7 | 5.67 | 43.7 | 2.03 | 17.5 | 0.73 | 5.2 | 2.94 μm |
| 113 | 100 | 40.4 | 95.1 | 14.4 | 73.2 | 5.17 | 40.2 | 1.85 | 16.1 | 0.66 | 4.7 | |
| 103 | 99.9 | 36.8 | 93.7 | 13.2 | 70.7 | 4.71 | 36.9 | 1.68 | 14.7 | 0.60 | 4.2 | D[v,0.9] |
| 93.6 | 99.9 | 33.5 | 92.3 | 12.0 | 68.0 | 4.29 | 33.9 | 1.53 | 13.4 | 0.55 | 3.4 | 29.41 μm |
| 85.2 | 99.8 | 30.5 | 90.7 | 10.9 | 65.3 | 3.91 | 31.1 | 1.40 | 12.1 | 0.50 | 2.4 | |
| 77.6 | 99.6 | 27.3 | 88.9 | 9.94 | 62.5 | 3.56 | 28.5 | 1.27 | 10.8 | | | D[v,0.1] |
| 70.7 | 99.4 | 25.3 | 87.0 | 9.05 | 59.6 | 3.24 | 26.2 | 1.16 | 9.7 | | | 1.19 μm |

| | | | | | |
|---|---|---|---|---|---|
| Source = :Sample | | Beam length = 2.2 mm | | Model indp | D[v,0.5] |
| Focal length = 100 | | Residual = 0.869% | | Volume Conc. = 0.0163% | 6.78 μm |
| Presentation = 0507 | | Obscuration = 0.2349 | | Sp.S.A. 2.0423 m²/cc. | |
| | | Volume distribution | | | |

TABLE 5

| High Size | Under % | High Size | Under % | High Size | Under % | High Size | Under % | High Size | Under % | High Size | Under % | Span 2.96 |
|---|---|---|---|---|---|---|---|---|---|---|---|---|
| 180 | 100 | 64.4 | 99.3 | 23.0 | 80.5 | 8.25 | 44.1 | 2.95 | 16.5 | 1.06 | 5.5 | D[4,3] |
| 164 | 100 | 58.7 | 98.9 | 21.0 | 77.0 | 7.51 | 41.1 | 2.69 | 15.2 | 0.96 | 4.9 | 14.06 μm |
| 149 | 100 | 53.4 | 98.3 | 19.1 | 73.3 | 6.84 | 38.2 | 2.45 | 13.9 | 0.88 | 4.3 | |
| 136 | 100 | 48.7 | 97.6 | 17.4 | 69.7 | 6.23 | 35.3 | 2.23 | 12.8 | 0.80 | 3.8 | D[3,2] |
| 124 | 100 | 44.3 | 96.5 | 15.9 | 66.2 | 5.67 | 32.4 | 2.03 | 11.7 | 0.73 | 3.4 | 3.96 μm |
| 113 | 100 | 40.4 | 95.2 | 14.4 | 62.8 | 5.17 | 29.4 | 1.85 | 10.6 | 0.66 | 3.1 | |
| 103 | 99.9 | 36.8 | 93.5 | 13.2 | 59.5 | 4.71 | 26.6 | 1.68 | 9.6 | 0.60 | 2.8 | D[v,0.9] |
| 93.6 | 99.9 | 33.5 | 91.6 | 12.0 | 56.2 | 4.29 | 24.1 | 1.53 | 8.7 | 0.55 | 2.2 | 31.28 μm |

TABLE 5-continued

| 85.2 | 99.8 | 30.5 | 89.4 | 10.9 | 53.0 | 3.91 | 21.8 | 1.40 | 7.8 | 0.50 | 1.6 | |
|---|---|---|---|---|---|---|---|---|---|---|---|---|
| 77.6 | 99.7 | 27.5 | 86.8 | 9.94 | 49.9 | 3.56 | 19.8 | 1.27 | 7.0 | | | D[v,0.1] |
| 70.7 | 99.5 | 25.3 | 83.8 | 9.05 | 47.0 | 3.24 | 18.0 | 1.16 | 6.2 | | | 1.74 μm |

| | | |
|---|---|---|
| Source = :Sample | Beam length = 2.2 mm | Model indp | 
| Focal length = 100 | Residual = 1.145% | Volume Conc. = 0.0206% |
| Presentation = 0.507 | Obscuration = 0.2326 | Sp.S.A. 1.5155 m²/cc. |
| | Volume distribution | |

D [v,0.5]
9.98 μm

Example 6

Figure 6:
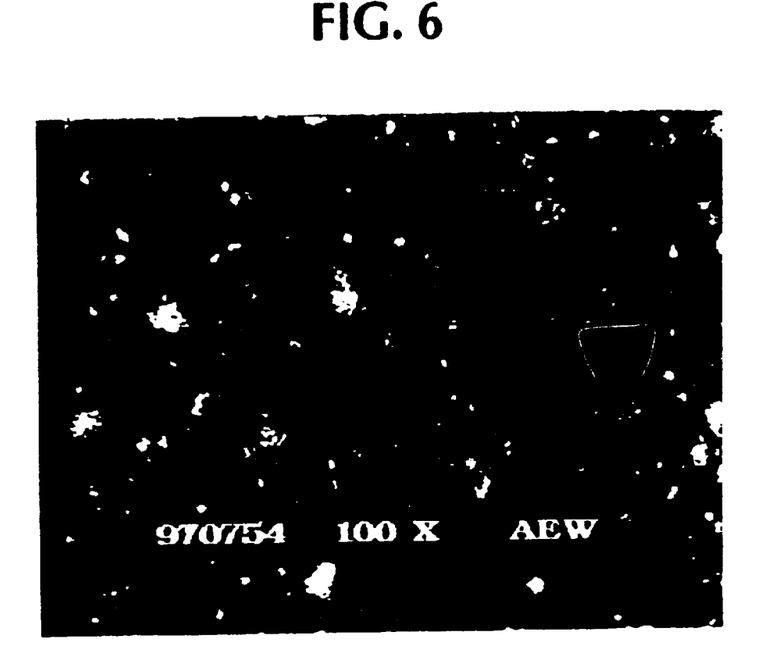
FIGS. 6 and 8 are photomicrographs of a product of the invention.
Figure 7:
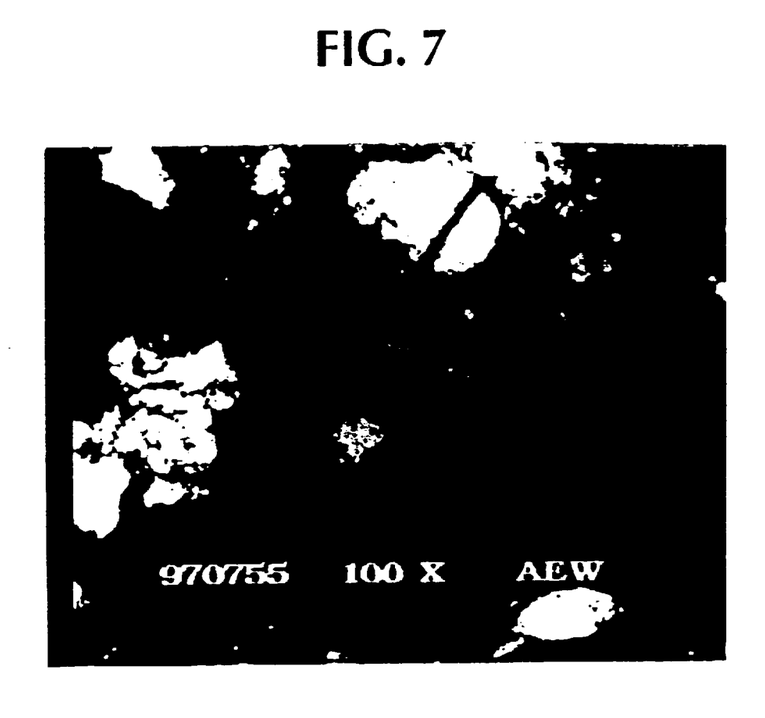
FIGS. 7 and 9 are photomicrographs of a conventional peanut butter product.
Figure 8:
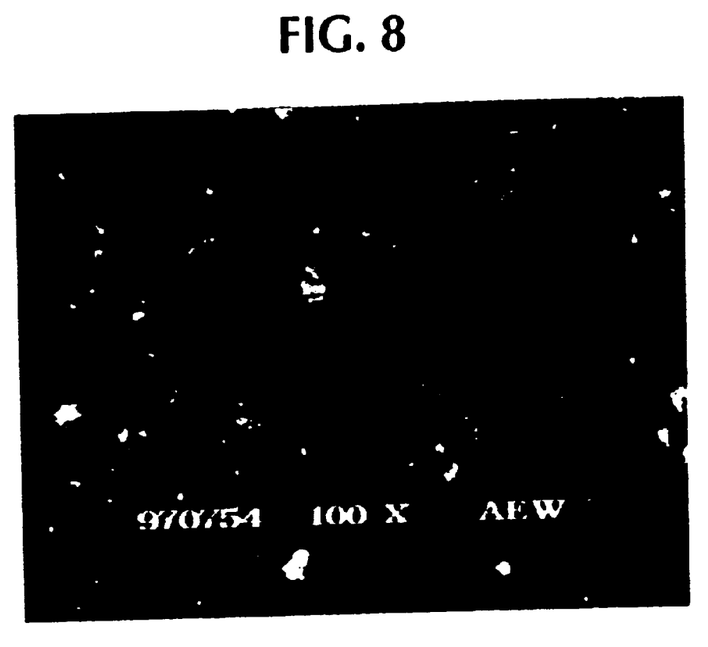
Figure 9:
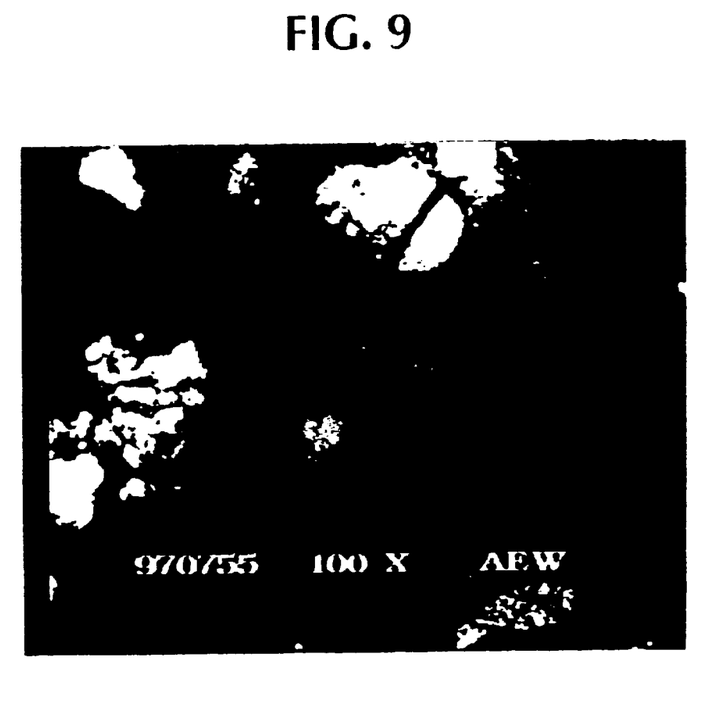

Photomicrographs were taken of a reduced fat peanut spread manufactured by a conventional process and a reduced fat peanut spread manufactured using the Gap mill. A polarized light microscope was used and the size, shape and distribution of the sugar contained in these products are defined when crossed polars are used (white particles on a black background). The photomicrographs of FIGS. 6 and 7 were taken with normal polarized light and the Gap mill product, FIG. 6, is shown to have substantially smaller particles of sugar than those of the conventional process, FIG. 7. The photomicrographs of FIGS. 8 and 9 were taken using a compensation filter and the Gap mill product, FIG. 8, is shown to have substantially smaller particles of sugar than those of the conventional process, FIG. 9.

Example 7

Sensory tests were carried out to compare conventionally manufactured reduced fat peanut spreads with reduced fat peanut spreads made using the Gap mill. The Gap mill product was found to be superior for consumer liking of all key texture attributes, overall flavor and overall liking.

The Gap mill also was found by consumers to be "just about right" for thickness while spreading and eating, smoothness, firmness and moistness. These attributes were all deficiencies for the conventionally manufactured product. The results are summarized in Table 6.

Expert panel testing for texture profile confirmed that the Gap mill product was easier to spread and stir and less adhesive (sticky) than the conventionally manufactured product. The results are summarized in Table 7.

Expert panel testing of flavor profile characteristics confirmed that the Gap mill product had lower soy flour aroma/flavor and higher dark roast aroma than the conventionally manufactured product. The results are summarized in Table 8.

It has been found according to the invention that prior art nut spread recipes requiring added nut oil can be modified by eliminating the added nut oil and adding more nuts instead. In making reduced fat peanut spreads, for example, peanut oil is added in conventionally manufactured products to help lower viscosity and improve texture. This is not required in the Gap mill product, because the Gap mill causes more oil to be expressed (see Table 9) and the oil is believed to coat the non-peanut particle surface area more effectively than in the conventional process.

The Gap mill product also has a lower percentage of fines and coarse particles and a higher percentage of mediums than conventionally manufactured products. This results in product that is not gritty and less adhesive/creamier since total particle surface area is reduced. The Gap mill product also has a higher percentage of free oil released than the conventionally manufactured product.

Additional comparative analytical data is set forth in Table 10.

TABLE 6

Population sample - 200 respondents having the following characteristics:
* Must eat peanut butter at least once a week
* Must eat creamy peanut butter most often
* Must have eaten reduced fat peanut butter in the past month
* NO tate participation in the past three months
* NO sensitive industry employment
* NO food allergies

| Attribute* | Conventionally Manufactured Product | Gap Mill Product | |
|---|---|---|---|
| Overall Liking | 6.36 | 7.18 | Gap mill product preferred |
| Overall Appearance | 7.41 | 7.5 | by 90% for: * Overall Liking |
| Color | 7.3a | 7.57 | * Ease of Spreading |
| Ease of Spreading | 5.65 | 8.01 | * Overall Flavor |
| Overall Flavor | 6.61 | 7.08 | * Overall Texture |
| Peanut Flavor | 6.86 | 7.16 | |
| Sweetness | 6.36 | 6.69 | |
| Saltiness | 6.14 | 6.22 | |
| Overall Texture | 5.82 | 7.06 | |

* All attributes were evaluated using a 9 point hedonic scale as follows:
9.0 = like extremely
8.0 = like very much
7.0 = like moderately
6.0 = like slightly
5.0 = neither like nor dislike
4.0 = dislike slightly
3.0 = dislike moderately
2.0 = dislike very much
1.0 = dislike extremely Just About Right Scale ("JR")

| | Conventionally Manufactured Product | Gap Mill Product |
|---|---|---|
| Thickness While Spreading (Too thick/JR/Too thin) | 64/36/0 | 6/73/20 |
| Peanut Flavor (Too strong/JR/Too weak) | 9/63/28 | 10/71/19 |
| Sweetness (Too sweet/JR/Not sweet enough) | 18/64/19 | 23/67/10 |
| Saltiness (Too salty/JR/Not salty enough) | 19/68/13 | 22/67/12 |
| Smoothness (Too smooth/JR/Not smooth enough) | 2/54/43 | 13/79/8 |
| Thickness While Eating (Too thick/JR/Too thin) | 64/34/1 | 16/71/13 |
| Firmness (Too firm/JR/Too soft) | 50/46/4 | 8178/14 |
| Moistness (Too moist/JR/Too dry) | 3/51/47 | 10/75/14 |
| Stickiness | 54/43/3 | 26/68/6 |

TABLE 6-continued (Too sticky/JR/Not sticky enough)

Descriptors that apply (% Yes)

| | Conventionally Manufactured Product | Gap Mill Product |
|---|---|---|
| Aftertase | 27 | 28 |
| Creamy | 44 | 74 |
| Dry | 38 | 11 |
| Fresh | 24 | 38 |
| Grainy | 8 | 10 |
| Gritty | 11 | 12 |
| Oily | 9 | 20 |
| Peanutty flavor | 52 | 60 |
| Salty | 22 | 18 |
| Smooth | 38 | 56 |
| Soft | 16 | 36 |
| Stale | 4 | 2 |
| Sweet | 32 | 36 |

TABLE 7

Texture Profile Evaluation

| Attributes | Conventionally Manufactured Product | Gap Mill Product | |
|---|---|---|---|
| No. of Observations | 16 | 15 | |
| Visual air pockets | 0.43 | 0.05 | |
| Emulsion stability | 0.13 | 0.33 | In comparison to conventionally manu- |
| Visible Firmness | 14.7 | 14.84 | factured product, Gap Mill product: |
| Surface Shine | 9.66 | 11.8 | |
| Ease of Spread | 8.73 | 7.27 | *Easier to Stir |
| Force to Stir | 10.93 | 8.55 | *Better blending ability |
| Visible particle amount | 0.03 | 0.01 | *Less adhesive |
| Visible particle size | 0.06 | 0.2 | *Spreads more in mouth |
| Stir-Air pockets | 0.13 | 0.13 | *Easier to manipulate |
| Blending ability | 11 | 11.87 | *More slippery in mouth |
| Denseness | 11.08 | 10.42 | *Breaks down faster in mouth |
| Force to compress | 8.55 | 7.71 | *Easier to spread on bread |
| Amount of Spread | 8.96 | 10.14 | |
| Slipperiness | 0.45 | 1.23 | |
| Comp-Adhesive | 8.61 | 7.6 | |
| Amount of Manipulation | 10.12 | 9.02 | |
| Manip. Adhesiveness | 9.47 | 8.99 | |
| Cohesiveness of Mass | 8.61 | 10.68 | |
| Mixes w/Saliva | 10.12 | 8.02 | |
| Rate of Dissipation | 7.17 | 8 | |
| Particle Amount | 1.13 | 1.09 | |
| Particle Size | 0.56 | 0.49 | |
| East of Swallow | 8.59 | 7.92 | |
| Oily Mouthcoat | 0.24 | 0.47 | |
| Residue | 0.78 | 0.61 | |

TABLE 8

Flavor Profile Evaluation

| Attributes | Conventionally Manufactured Product | Gap Mill Product | |
|---|---|---|---|
| No. of Observations | 12–15 | 12–15 | |
| Aroma | | | In comparison to con- |
| Blendedness | 7.58 | 9.01 | ventionally manufactured |
| Briny | 1.66 | 1.34 | product Gap mill product |
| Sweet Fragrance | 3.51 | 3.14 | had; |

TABLE 8-continued

Flavor Profile Evaluation

| Attributes | Conventionally Manufactured Product | Gap Mill Product | |
|---|---|---|---|
| Total Peanut | 4.53 | 4.88 | *Higher dark roast aroma |
| Dark | 0.3 | 1.45 | *Lower soy aroma |
| Medium | 3.72 | 4.43 | *Lower light roast flavor |
| Shells | 2.11 | 1.83 | *Higher bitter flavor |
| Soy Flour | 4.18 | 2.86 | *Lower soy flour flavor |
| Flavor | | | |
| Blendedness | 9.02 | 8.59 | |
| Total peanut | 5.03 | 5.28 | |
| Dark | 0.52 | 1.43 | |
| Medium | 4.09 | 4.58 | |
| Light | 0.56 | 0 | |
| Salt | 7.98 | 7.0 | |
| Sweet | 6.72 | 7.32 | |
| Bitter | 1.66 | 2.67 | |
| Shells | 2.25 | 1.66 | |

TABLE 8-continued

Flavor Profile Evaluation

| Attributes | Conventionally Manufactured Product | Gap Mill Product |
|---|---|---|
| Soy flour | 5.39 | 4.35 |
| Mouthdry | 4.84 | 4.49 |
| Salivation | 2.49 | 2.86 |
| Aftertaste-peanut | 4.3 | 3.25 |
| Aftertaste-Salt | 2.83 | 2.49 |

TABLE 9

% Oil release

| | |
|---|---|
| Conventionally mfd. product | 12.70% |
| Gap Mill Product | 14.12% |

| Particle Size (Malvern) | Gap Mill Product |
|---|---|
| <1.52 microns | 7.93 |
| <5.79 microns | 35.84 |
| <15.05 microns | 68.69 |
| <22.04 microns | 78.27 |
| <39.08 microns | 90.27 |
| <57.25 microns | 95.98 |
| <69.30 microns | 97.75 |
| <83.87 microns | 98.79 |
| <101.52 microns | 99.32 |
| <122.87 microns | 99.58 |
| <148.72 microns | 99.78 |
| Mean (4, 3) = | 15.49 |
| SPAN | 4.38 |

TABLE 10

Analytical Data

| | Conventionally Manufactured Product | Gap Mill Product |
|---|---|---|
| Density | 1.21 | 1.217 |
| % Moisture | 1.68 | 1.14 |
| % Protein | 22.14 | 22.72 |
| % Fat | 34.25 | 34.41 |
| % Salt | 1.10 | 1.26 |
| Viscosity | 25,000 cp | 8100 cp |

What is claimed is:

1. A method for producing a nut butter or nut spread composition which comprises:
   a) mixing together a nut ingredient and a stabilizing agent to make a mixture;
   b) introducing the mixture into a mill comprising a stationary stator having Protruding corrugations and recess corrugations and a circularly rotating rotor having protruding vanes and recess vanes wherein said stator and said rotor are radially aligned within said mill forming a grinding baffle defined by the space between said protruding vanes and said protruding corrugations and said mixture moves radially within said grinding baffle, said rotor capable of grinding the mixture while producing centrifugal forces; and
   c) grinding the mixture in one pass through the mill such that said centrifugal forces cause the particles of the mixture impact one another and the rotor and stator, thereby forming a ground paste.

2. The method of claim 1, wherein the stabilizing agent comprises edible glyceride fats or partially or fully hydrogenated oils such as rapeseed, cottonseed, corn, peanut, soybean, linseed, palm oils and combinations thereof.

3. The method of claim 1 wherein salt and a sweetener are mixed with the ingredients in step (a).

4. The method of claim 3 wherein the sweetener is selected from the group consisting of sucrose, dextrose, fructose, honey, molasses, saccharin and combinations thereof.

5. The method of claim 1 wherein a bulking agent is mixed with the ingredients in step (a).

6. The method of claim 5 wherein the bulking agent is selected from the group consisting of polydextrose, maltodextrin, corn syrup solids, microcrystalline cellulose and combinations thereof.

7. The method of claim 1 wherein an emulsifier is mixed with the ingredients in step (a).

8. The method of claim 1 wherein nut skins are mixed with the ingredients in step (a).

9. The method of claim 1 wherein a stream of air or other gas is added to the mixture during the grinding of the mixture.

10. A nut butter composition produced by the method of claim 1.

11. A peanut butter composition produced by grinding peanuts according to the method of claim 1.

12. A reduced fat nut butter or spread produced by the method of claim 1.

13. The method of claim 1 wherein said grinding baffle is separated from said rotor at a space of about 1 millimeter to about 8 millimeters.

14. A method for producing a reduced fat peanut spread composition which comprises:
   a) mixing together peanut solids, a stabilizing composition comprising hydrogenated rapeseed and cottonseed oils, an emulsifier and a bulking agent to make a mixture;
   b) introducing the mixture into a mill comprising a stationary stator having protruding corrugations and recess corrugations and a circularly rotating rotor having protruding vanes and recess vanes wherein said stator and said rotor are radially aligned within said mill forming a grinding baffle defined by the space between said protruding vanes and said protruding corrugations and said mixture moves radially within said grinding baffle, said rotor capable of grinding the mixture while producing centrifugal forces; and
   c) grinding the mixture in one pass through the mill such that said centrifugal forces cause the particles of the mixture impact one another and the rotor and stator, thereby forming a ground paste.

15. The method of claim 14 wherein the bulking agent is selected from the group consisting of polydextrose, maltodextrin, corn syrup solids, microcrystalline cellulose and combinations thereof.

16. The method of claim 14 wherein taste and color enhancers are mixed with the ingredients in step (a).

17. The method of claim 16 wherein the taste and color enhancers are selected from the group consisting of ground roasted peanuts, peanut flour and butter flavors.

18. The method of claim 14 wherein peanut skins are mixed with the ingredients in step (a).

19. A reduced fat peanut butter composition produced by the method of claim 14.

20. The method of claim 14 wherein said grinding baffle is separated from said rotor at a space of about 1 millimeter to about 8 millimeters.

* * * * *